United States Patent Office 3,240,828
Patented Mar. 15, 1966

3,240,828
PROCESS FOR THE PRODUCTION OF ALKYL-SUBSTITUTED BICYCLO[2.2.1]HEPT-2-ENE
Henry E. Fritz, Charleston, and Kenneth E. Atkins, South Charleston, W. Va., assignors to Union Carbide Corporation, a corporation of New York
No Drawing. Filed July 29, 1963, Ser. No. 298,477
8 Claims. (Cl. 260—666)

This invention relates to a novel method for the alkylation of bicyclo[2.2.1]hept-2-ene. More particularly, this invention relates to a simple method for the production of bicycloheptenes substituted on the 1-, 2-, 3- or 4-positions.

Prior to this invention substituted bicyclo[2.2.1]-hept-2-enes were generally produced by the Diels-Alder addition of a mono-olefinically unsaturated compound to a cyclopentadiene, as indicated by the following equation:

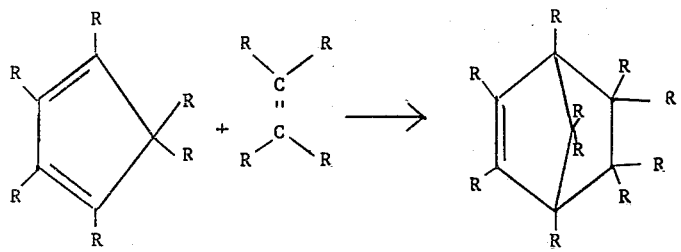

wherein each R is hydrogen or a substituent. Because of the relative unavailability of substituted cyclopentadienes, this process was normally employed to produce 5- or 6-substituted bicyclo[2.2.1]hept-2-enes. The process of this invention provides, for the first time, a general, simple synthesis of bicyclo[2.2.1]hept-2-enes substituted in the 1-, 2-, 3- and/or 4-positions from readily available starting materials.

The process of this invention essentially comprises the reaction of bicyclo[2.2.1]hept-2-ene with an alcohol, as hereinafter defined, in contact with a basic catalyst whereby the bicyclo[2.2.1]hept-2-ene is substituted in the 1-, 2-, 3- or 4-positions.

The alcohols which are employed in accordance with the process of this invention are monohydric hydrocarbon alcohols free from aliphatic (olefinic and acetylenic) unsaturation wherein the hydroxyl group is bonded to a carbon atom having at least one hydrogen atom bonded thereto, i.e., primary and secondary alcohols. These alcohols can be represented by the formula:

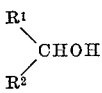

wherein each $R^1$ and $R^2$, when taken alone, can be hydrogen or a hydrocarbon group free from aliphatic unsaturation, such as alkyl, cycloalkyl or aryl; and $R^1$ and $R^2$, when taken together, form a divalent alkanediyl group which, when taken with the >CH— group, forms a cycloalkyl group of from 4 to 8 ring members. In general, the alcohols can have from 1 to about 15 carbon atoms, with alcohols having from 1 to about 10 carbon atoms being preferred. As examples of suitable alcohols one can mention methanol, ethanol, n-propanol, isopropanol, n-butanol, sec.-butanol, the primary and secondary pentanols, the primary and secondary hexanols, the primary and secondary octanols, the primary and secondary decanols, benzyl alcohol, phenethyl alcohol, α-methylbenzyl alcohol, α-ethylbenzyl alcohol, 3-phenyl-4-octanol, cyclohexylmethanol, cyclopropanol, methylcyclopropanol, cyclopentanol, cyclohexanol, cyclooctanol and the like.

The basic catalysts which are employed are strong bases, such as alkali metal hydroxides or alkali metal oxides of the alcohols employed in the reaction. The preferred basic catalysts are sodium or potassium hydroxides or sodium or potassium oxides of the alcohols.

The mole ratio of alcohol to bicyclo[2.2.1]hept-2-ene in the reaction mixture is not narrowly critical. However, it is preferred to employ at least equimolar amounts. Excess amounts of alcohol can be employed as a reaction solvent, if desired. The catalytic amount of base in the initial charge is not narrowly critical and can vary from about 1 to about 10 mole percent based on the alcohol charged. At lower amounts the reaction proceeds too slowly for practical use and, although higher amounts can be employed, no particular advantage is obtained thereby.

The reaction temperature is not narrowly critical, and temperatures of from about 150° C. to about 400° C. have been found suitable. Optimum yields of substituted bicycloheptenes are obtained at temperatures of from about 220° C. to 280° C. Because the reaction is a liquid phase reaction, it is desirable to conduct the reaction under elevated pressure to prevent vaporization of the reactants. The reaction time can vary from a few minutes up to several hours, depending on whether the process is conducted continuously or in a batch-wise manner. In general, times of from 1 to about 10 hours can be employed in a batch process. Inert reaction media, such as toluene, xylene, isooctane and the like can be employed, if desired. The products produced by the process of this invention will vary according to the alcohol employed in the reaction. If a primary alcohol is employed, the main products are monosubstituted bicycloheptenes, with the 2-isomer predominating. However, 1.3-, 1,4-, 1,2,4- and 1,2,3,4-substituted bicycloheptenes are also obtained in small yields. In the other hand, disubstituted bicycloheptenes are normally obtained when secondary alcohols are employed, with the 1,3-isomer predominating. In addition, 1-, 2- and 1,2,4-isomers can be obtained in smaller yields.

The products of the process of this invention are recovered from the reaction mixture by conventional procedures.

The following examples are illustrative.

*Example I*

A 3-liter, stainless steel, rocker autoclave was charged with 50 grams of bicyclo[2.2.1]hept-2-ene, 41 grams of approximately 50 percent sodium methoxide in methanol and 1 liter of methanol. The autoclave was sealed, heated to 235° C. within 2 hours and maintained at 228° C. to 252° C. for 3.2 hours. After cooling to room temperature and storing at room temperature overnight, the reaction mixture was heated to 240° C. in 2.5 hours and maintained at 240° C. to 279° C. for 5.5 hours. The maximum observed autogenous pressure during the reaction was 2100 p.s.i. After cooling and opening the autoclave the reaction mixture was filtered to remove insoluble residues and then admixed with water. The aqueous mixture was extracted with hexane and the hexane extract was washed with water until it had a pH of about 7. The water-washed material was distilled to recover 13 grams of a mixture of 1-methylbicyclo[2.2.1]-hept-2-ene and 2-methylbicyclo [2.2.1]hept-2-ene at a temperature of from 104° C. to 125° C. This mixture contained predominantly the 2-isomer, as indicated by infrared analysis.

*Example II*

A 1-liter, stainless steel rocker autoclave was charged with 50 grams of bicyclo[2.2.1]hept-2-ene and a solution of 4 grams of sodium in 260 grams of 2-ethylhexanol. The autoclave was sealed and heated at 220–282° C. for 4.25 hours, during which time the maximum autogenous pressure observed was 361 p.s.i. The reaction mixture was washed with water until a pH of about 7 was achieved, and the water-washed product was distilled to recover 21 grams of (2-ethylhexyl)bicyclo[2.2.1]hept-2-ene at 83° C. and 0.20 mm. The product consisted predominantly of the 2-isomer although there was a small amount of 1-isomer present.

*Microanalysis.*—Calculated for $C_{15}H_{26}$: C, 87.3; H, 12.7. Found: C, 87.1; H, 12.7.

*Example III*

Employing apparatus and procedures similar to those described in Example II, except that 10 grams of potassium hydroxide (85 percent pure) were substituted for the sodium there were recovered 17 grams of 1- and 2-isomers of (2-ethylhexyl)bicyclo[2.2.1]hept-2-ene.

*Example IV*

A 1-liter, stainless steel rocker autoclave was charged with 50 grams of bicyclo[2.2.1]hept-2-ene and a solution of 2 grams of sodium in 314 grams of 2,2-diethylpentanol. The reaction mixture was heated to 235° C. in 2.5 hours and maintained at 235° C. to 256° C. for 3 hours. After standing at room temperature overnight, the mixture was heated to 254° C. in 3 hours and maintained at 243–262° C. for 5 hours. The maximum observed autogenous pressure was 225 p.s.i.g. The mixture was distilled to recover 18 grams of crude 2-(2′,2′-diethylpentyl)bicyclo-[2.2.1]hept-2-ene at 79–97° C. and 0.35–1.2 mm. On redistillation, there were recovered 8 grams of 2-(2′,2′-diethylpentyl)bicyclo[2.2.1]hept-2-ene at 81° C. and 0.40 mm.

*Example V*

A 1-liter, stainless steel rocker autoclave was charged with 50 grams of bicyclo[2.2.1]hept-2-ene and a solution of 2 grams of sodium in 500 milliliters of isopropanol. The autoclave was sealed, heated to 239° C. in 4 hours and maintained at 239–253° C. for 4 hours, during which itme the maximum observed autogenous pressure was 1600 p.s.i.g. The autoclave was cooled to room temperature, opened and the contents were washed with water and then extracted with isopropyl ether. After water-washing to a pH of about 7, the ether extract was vacuum distilled to recover 31 grams of diisopropylbicyclo[2.2.1]hept-2-ene at 113–118° C. and 92 mm. The product was a mixture of the 1,3- and 1,4-isomers, with the 1,3-isomer predominating, as determined by nuclear magnetic resonance analysis.

*Example VI*

A 1-liter, stainless steel rocker autoclave was charged with 50 grams of bicyclo[2.2.1]hept-2-ene, 500 grams of cyclohexanol and 15 grams of potassium hydroxide (85 percent pure). The autoclave was sealed, heated to 242° C. in 3 hours and maintained at 242–271° C. over 4 hours, during which time the maximum observed autogenous pressure was 622 p.s.i.g. After cooling to room temperature, the reaction product was admixed with water. The resulting mixture was extracted with isopropyl ether and the ether extract was vacuum distilled to recover 44 grams of crude dicyclohexylbicyclo[2.2.1]hept-2-ene at 117–122° C. and 2.22 mm. The product consisted of the 1,3- and the 1,4-isomers, with the 1,3-isomer predominating.

*Example VII*

To a ⅜-inch I.D., 350 cc., tubular reactor were fed 805 grams of bicyclo[2.2.1]hept-2-ene and 4195 of a 5 percent solution of potassium hydroxide in isopropanol at a temperature of 290° C. and a pressure of 2000 p.s.i. over a period of 3.4 hours. The reaction product, weighing 4604 grams, was admixed with water, and the aqueous mixture was extracted with hexane. The hexane extract was washed with water to a pH of about 7 and then distilled. A fraction boiling at 95–109° C. and 50 mm. was recovered which contained 46 grams of diisopropylbicycloheptene.

What is claimed is:

1. The process for producing a substituted bicyclo-[2.2.1]hept-2-ene which comprises heating at 150° C. to 400° C. a mixture of bicyclo[2.2.1]hept-2-ene and a monohydric hydrocarbon alcohol having from 1 to 15 carbon atoms, said alcohol having no aliphatic unsaturation and having the hydroxyl group bonded to a carbon atom having at least one hydrogen atom bonded thereto, in contact with a catalytic amount of a strong base, for a period of time sufficient to produce said substituted bicyclo[2.2.1]hept-2-ene.

2. The method for producing a substituted bicyclo-[2.2.1]hept-2-ene which comprises heating at 150° C. to 400° C. a mixture of bicyclo[2.2.1]hept-2-ene and a monohydric hydrocarbon primary alcohol of from 1 to 15 carbon atoms, said alcohol being free from aliphatic unsaturation, in contact with a catalytic amount of a strong base, for a period of time sufficient to produce said substituted bicyclo[2.2.1]hept-2-ene.

3. The process of claim 2, wherein said alcohol is methanol.

4. The process of claim 2, wherein said alcohol is 2-ethylhexanol.

5. The process of claim 2, wherein said alcohol is 2,2-diethylpentanol.

6. The process for producing a substituted bicyclo-[2.2.1]hept-2-ene which comprises heating at 150° C. to 400° C. a mixture of bicyclo [2.2.1]hept-2-ene and a monohydric hydrocarbon secondary alcohol of from 3 to 15 carbon atoms, said alcohol being free of aliphatic unsaturation, in contact with a catalytic amount of a strong base, for a period of time sufficient to produce said substituted bicyclo[2.2.1]hept-2-ene.

7. The process of claim 6 wherein said alcohol is isopropanol.

8. The process of claim 6 wherein said alcohol is cyclohexanol.

References Cited by the Examiner

UNITED STATES PATENTS

| | | | |
|---|---|---|---|
| 2,448,641 | 9/1948 | Whitman | 260—666 |
| 2,721,885 | 10/1955 | Pines et al. | 260—668 |
| 2,966,527 | 12/1960 | Schmerling | 260—666 |

OTHER REFERENCES

M. Blanchard et al.: Compt. Rend., 258(9), 2593–4, 1964.

DELBERT E. GANTZ, *Primary Examiner.*